Figure 1:
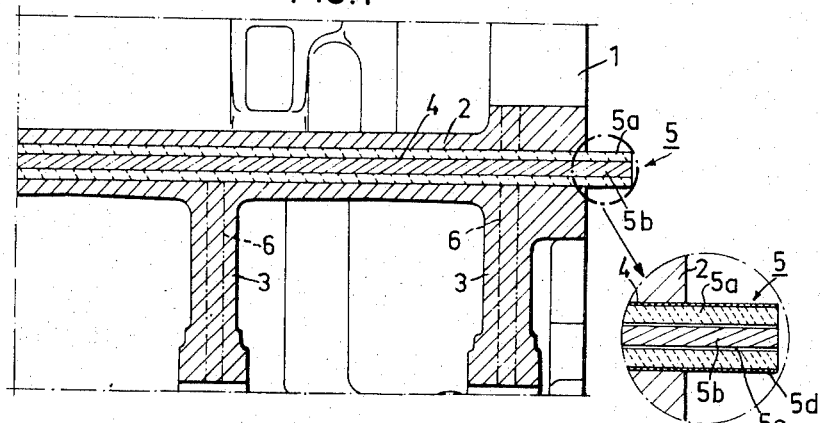

ns Patent

Wahlqvist

[11] 3,805,874
[45] Apr. 23, 1974

[54] METHOD FOR FORMING A CANAL WHEN MOULDING A METAL BLOCK
[75] Inventor: Hans Sigvard Wahlqvist, Sodertalje, Sweden
[73] Assignee: Saab-Scania Aktiebolag, Sodertalje, Sweden
[22] Filed: Mar. 8, 1972
[21] Appl. No.: 232,706

[30] Foreign Application Priority Data
Mar. 15, 1971 Sweden.............................. 3270/71

[52] U.S. Cl.................. 164/132, 164/368, 164/370
[51] Int. Cl............................................. B22d 29/00
[58] Field of Search ........... 164/132, 365, 366, 367, 164/368, 369, 370

[56] References Cited
UNITED STATES PATENTS
282,518   8/1883   Herrick.................. 164/370
2,991,520 7/1961   Dalton................... 164/369 X
3,596,703 8/1971   Bishop et al............ 164/132

FOREIGN PATENTS OR APPLICATIONS
46,942    1/1971   Japan.................... 164/369
4,322,081 9/1968   Japan.................... 164/369
229,765   3/1969   U.S.S.R................. 164/369

Primary Examiner—J. Spencer Overholser
Assistant Examiner—John E. Roethel
Attorney, Agent, or Firm—Cushman, Darby & Cushman

[57] ABSTRACT

The present disclosure relates to a method for forming a canal when moulding a metal block, said canal being defined by a core inserted into the mould. The method involves using a core comprising a tube of powdered or granulated refractory material held together by an organic binding agent, and a rod located within the tube, coating the core with a blacking agent prior to moulding, carrying out the moulding operation and simultaneously combusting the binding agent and leading off gases through the core, and finally removing the rod and clearing away the remnants of the tube in the canal formed. The disclosure also provides a core suitable for use in said method.

9 Claims, 6 Drawing Figures

METHOD FOR FORMING A CANAL WHEN MOULDING A METAL BLOCK

The present invention relates to a method for forming a canal when moulding a metal block, for instance a cast iron block, said canal being defined by a core inserted into the mould. The invention also relates to a core suitable for use in said method.

Known procedures for forming, for instance, oil canals in engine blocks or the like have caused big problems for manufacturers because required machining after the moulding operation often limits the choice of suitable alloys. As a result it is an old wish to be able to eliminate machining of longitudinal canals in metal blocks, but so far no satisfying solution to said problem is known.

Conventional methods using cores are not adaptable for moulding longitudinal canals having a limited cross-sectional area. Because of this, such canals are made by embedment of steel tubes. Such a procedure requires that each steel tube be manually filled with or be rammed by vibration with silica flour in order to prevent melting. The method is complicated and costly, but it is quite adequate as long as no other canals are to be connected to the canal embedded into the block. In other words, it is not advantageous to use said method to obtain an oil canal system in an engine block or the like. The reason is that such tube shaped steel cores, in order to prevent formation of blisters and porosities in the moulded metal, normally are treated with a coating agent before starting the moulding process. Such an agent quickens the solidifying of the metal around the core, but it also causes a structural change in the core, thus causing a considerable increase in hardness, which means that it becomes considerably more difficult to make connecting canals to an embedded main canal. Besides, there is always a risk of producing burrs when penetrating the steel tube by drilling. Burrs that are not removed after the drilling operation, especially when the canals are part of the lubrication system of an engine, can cause considerable damage and stoppage to machine equipment or the like.

Considering the above difficulties, it is common in blocks of metal to drill all the canals. When having long canals it is common to drill through from both ends of the canal. This method requires very good tools, but it requires even more a homogeneous structure in the material being machined. Considering these facts, industry often has to compromise when selecting alloys of metals. From the point of view of foundry practice, it is often dsirable to have a high content of alloying elements, for example of chromium; but this causes considerable difficulties in regard to machining. It has been shown that castings with a high content of alloying elements have a non-homogeneous structure. They also have local grinders and hard spots that can force the drill to penetrate in an unintended direction. As a result of this, and because the structure surrounding the canals often is thin, there is a great risk for cassations due to damaged canals.

The purpose of the present invention is to eliminate said drawbacks and to create a method and a core that can be used to make narrow canals in blocks of metal in a simple and efficient way.

The method according to the invention is mainly characterized in that the core used comprises a tube of powdered or granulated refractory material held together by an organic binding agent low in gas, said binding agent having a melting temperature below the melting point of the metal (or the alloy of metals), a rod being located in and guided by the tube, coating the core with a blacking agent prior to carrying out the moulding operation, said blacking agent being capable of resisting temperatures at least equal to the melting point of the metal, carrying out the moulding operation and thereby simultaneously combusting the binding agent and leading off gases through a cavity or outlet between the rod and the inside of the tube, and removing the rod in order to facilitate clearing the canal formed in the moulding operation of the remnants of the refractory material.

The method according to the present invention has considerable advantages. Although cores of refractory material have a high non-recurrent cost, the method still allows essential reduction of production costs because of the fact that the above mentioned cassation risk is completely eliminated. Although it is previously known to use cores of refractory material during precision moulding in order to produce precision moulded products having cavities of complicated shape, the methods used are not suited for shaping narrow canals in blocks of metal. The method according to the present invention, however, contrary to other known methods using cores to make canals, is well suited for mass production because steps which are more or less manual have been eliminated.

A core especially suitable for use in the method according to the present invention comprises a tube consisting of powdered or granulated refractory material held together by an organic binding agent low in gas, said binding agent having a melting point below the melting point of the metal to be moulded, and a rod essentially coaxially located within the tube.

Further features and advantages will be disclosed in the attached description and claims.

Figure 2:
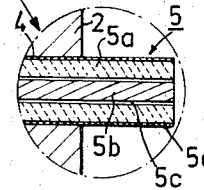
Figure 3:
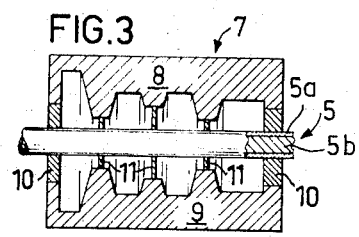
Figure 4:
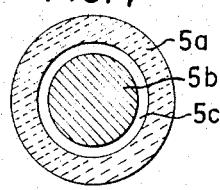
Figure 5:
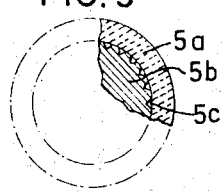
Figure 6:
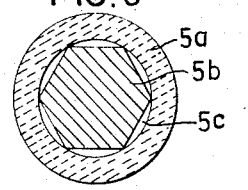

The invention will now be further described with reference to the accompanying drawings, in which FIG. 1 shows part of a longitudinal section through a molded engine block in which the core is left in, FIG. 2 shows an enlarged part of the section in FIG. 1, FIG. 3 shows a longitudinal section through a mould before moulding is done, FIG. 4 shows a section through an embodiment of the core, and FIGS. 5 and 6 show sections through other embodiments of the core.

The engine block 1 shown in FIG. 1 is made by introducing, via a gate system, a melted metal or alloy of metals into a mould (not shown). The shape of the mould cavity corresponds to the shape of the engine block 1, and the mould cavity thus has a longitudinal, narrow cavity and a number of transversal cavities that are connected to said narrow cavity in order to provide sections 2, 3 for an oil canal system.

According to the present invention a main channel 4 being part of the oil canal system is formed when casting the engine block. This forming of the canal is done by means of a core 5 that has the shape of a rod, the length of which is greater than the length of the engine block 1 in order to provide a means for fastening the core in core markings (not shown) that in a known manner are provided in the body of the mould, one at each end of the section 2. The core 5 is exposed to strong heat and to great forces sideways when the molten metal enters the mould cavity. The core is also under stress by forces emanating from contraction in the moulded body when said body is solidifying. The core 5 comprises a tube 5a that is reinforced by a rod 5b located in and guided by the tube (see also FIG. 2). Side channels 6 situated in the sections 3 and indicated in the drawing by broken-dotted lines, are preferably drilled after the core 5 has been removed. Drilling said channels involves no difficulties or risks.

As is evident from FIG. 3, the core 5 is held in place in a mould 7, comprising an upper flask 8 and a lower flask 9, by having its end portions fixed in core marks 10 on the mould. The core is also held in place by means of a number of spacing elements 11 that are slipped on the core. The spacing elements are supported by positive stops in the flasks and they can, for instance, have the shape of washers or the like. Said spacing elements are intended for straightening out an initially bent core and for supporting the core during the moulding operation so that the core is not bent.

During the moulding operation the material in the tube 5a is converted and gives off gases. In order to avoid the bursting effect it is necessary to lead off these gases. This is preferably accomplished by shaping the rod 5b so that a cavity or outlet 5c (see FIG. 2) is formed between the inside of the tube 5a and the rod 5b, the gases thus being provided with an escape route. In FIGS. 4-6 some embodiments of the core are shown. As shown in FIG. 4, the outside diameter of the rod 5b is smaller than the inside diameter of the tube 5a, and the outlet 5c has a general ring-shaped appearance. Because the tube and the rod are not always exactly straight, they will be in contact with each other in spots, but this does not prevent gas from escaping. As shown in FIGS. 5 and 6, the outside diameter of the rod is essentially equal to the inside diameter of the tube resulting in a tight fit. In FIG. 5 the outlet 5c is made up by a number of grooves in the surface of the rod 5b, and in FIG. 6 the outlet is obtained by a number of bevels on the rod. Also a number of other embodiments are possible.

The tube 5a consists of a powdered or granulated refractory material that is held together by a binding agent, and the tube is preferably manufactured by pressure moulding. It is essential for the method presented in this invention that the binding agent for the refractory material has a well defined melting temperature, and that said melting temperature be lower than the melting point of the metal (or of the alloy of metals). In this way it is achieved that the tube of refractory material during a moulding operation is brought, by the heat of the molten metal, to a stage of disintegration before the moulding procedure is finished. When moulding, for instance, cast iron or cast iron alloys, the melting temperature of the binding agent should be at least 100°C lower than the melting point of the cast iron. Depending on the type of cast iron alloy and the kind of refractory material used, the melting temperature of the binding agent can be chosen within a wide range of temperatures.

Tests have shown that a ceramic material can be used as the refractory material, preferably crushed glass; but other refractory materials such as silicon sand can also be used. The binding agent is meant to disintegrate, e.g. burn, during the moulding operation without generating too much gas, and it has proved suitable to use an organic binding agent low in gas. For moulding cast iron or cast iron alloys it has proved advantageous to use a binding agent containing cellulose, the binding agent having a melting point below 600°C, preferably in the interval 400° - 500°C. A binding agent named Modocoll, normally used for wall paper hanging and the like, has proved very suitable when added in an amount which is less than 6 percent, preferably about 3 percent, of the total weight of the refractory material and the binding agent.

In order to prevent the molten metal from sticking to the core 5, and in order to prevent the disintegration of tube from interfering with the shaping of canals during the moulding operation, the exterior of the tube 5a is preferably coated with a blacking agent capable of resisting temperatures exceeding the melting point of the metal. When moulding chromium alloy cast iron, where chromium is used as an efficient carbide stabilizing agent in order to achieve a hard material having low edge shortness and considerable durability and strength, the blacking agent should be capable of resisting temperatures of at least 1,600°C. The blacking agent is preferably graphite but also, for instance, silica flour dispersed in water can be used.

A tube 5a treated in the above manner keeps its shape during the moulding operation and does not fall apart until the rod 5b is removed after the moulding operation. The channel 4 thus formed can easily be cleared of the remnants from the tube 5a.

The method and the core according to the present invention can be varied within the scope of the following claims. It is, for example, possible to produce the core 5 by coating a rod 5b with a layer of refractory material held together by a binding agent. The core obtained in this way can easily be made stiffer than a core having a rod inserted in a premanufactured tube, and besides there is no problem of assembling tube and rod. Still another advantage is that the core stiffness could be increased so as to make the use of spacing elements on the core unnecessary during the moulding operation.

What is claimed is:

1. A method for forming an elongated canal of limited cross-sectional area in a molded metal block comprising: inserting in a mold a core which comprises a tube of powdered or granulated refractory material held together by an organic binding agent having a thermal decomposition temperature below the melting point of the metal to be molded, the binding agent being of a composition which gives off little gas when thermally decomposed, said core also including an elongated reinforcing member disposed within said tube so as to form between said member and the inside of said tube at least one longitudinally extending vent; adding molten metal to the mold to form the metal block and to thermally decompose the binding agent and simultaneously leading off the resulting gas through said vent to a location outside said mold; allowing the molten metal to solidify to thereby form a canal in the metal block; and removing the elongated reinforcing member in order to facilitate the removal of refractory material of the tube from the canal.

2. A method as in claim 1 wherein said refractory material comprises ceramic material.

3. A method as in claim 1 wherein the binding agent comprises cellulose.

4. A method as in claim 1 including the step of supporting the core in the mold by providing spacing elements along the length of the core, said elements engaging the exterior of the core and the interior of the mold.

5. A method as in claim 1 including the step of coating the core with a blackening agent prior to carrying out the molding operation, the blackening agent resisting temperatures at least equal to the melting point of the metal being molded.

6. A method as in claim 5 wherein the blackening agent is selected from the group consisting of graphite and silica flour.

7. A method as in claim 1 wherein said elongated member is a rod.

8. A method as in claim 1 wherein the refractory material of the tube is selected from the group consisting of crushed glass and silica sand.

9. A method of molding cast iron or cast iron alloys and for forming an elongated canal of limited cross-sectional area in the molded metal, said method comprising: inserting in a mold a tube constructed of powdered or granulated refractory material and an organic binding agent having a melting point below 600°C, said binding agent including cellulose and being present in an amount less than 6 percent of the total weight of the refractory material and the binding agent; internally supporting the tube with an imperforate rod-like reinforcing member disposed within the tube so as to support the tube and to form between the member and the tube wall a longitudinally extending vent; adding molten cast iron or cast iron alloy to the mold thereby thermally disintegrating the binding agent and leading off the resulting gas through said vent to a location outside the mold; after solidification of the molten metal withdrawing the rod-like member longitudinally from the mold; clearing the remnants of the refractory material from the resulting canal in the solidified metal.

* * * * *